US00RE39674E

(19) United States
(12) Reissued Patent
Watanabe

(10) Patent Number: US RE39,674 E
(45) Date of Reissued Patent: Jun. 5, 2007

(54) PERIPHERAL AND CAMERA SYSTEM USING THE SAME, FOR REWRITING PROGRAMS STORED IN A CAMERA

(75) Inventor: Youji Watanabe, Fuchu (JP)

(73) Assignee: Olympus Optical Co., Ltd., Tokyo (JP)

(21) Appl. No.: 10/410,035

(22) Filed: Apr. 9, 2003

Related U.S. Patent Documents

Reissue of:
(64) Patent No.: 6,219,494
Issued: Apr. 17, 2001
Appl. No.: 09/413,228
Filed: Oct. 6, 1999

(30) Foreign Application Priority Data

Oct. 8, 1998 (JP) ..... 10-286594

(51) Int. Cl.
*G03B 17/00* (2006.01)

(52) U.S. Cl. ..... 396/300
(58) Field of Classification Search ..... 396/300; 348/207.1, 207.11
See application file for complete search history.

(56) References Cited

U.S. PATENT DOCUMENTS 4,853,733 A * 8/1989 Watanabe et al. ..... 396/300
5,278,604 A * 1/1994 Nakamura ..... 396/71
5,752,089 A * 5/1998 Miyazawa et al. ..... 396/48
6,151,450 A * 11/2000 Numako ..... 396/48
6,195,511 B1 * 2/2001 Harada ..... 396/300

FOREIGN PATENT DOCUMENTS

JP 58-113021 * 8/1983

* cited by examiner

*Primary Examiner*—W. B. Perkey
(74) *Attorney, Agent, or Firm*—Frishauf, Holtz, Goodman & Chick, P.C.

(57) ABSTRACT

In a camera system, if software is rewritten in accordance with the change in hardware structure, compatibility between the hardware and the software is determined, thereby avoiding a problem, such as an inoperable condition or a breakdown of a component. The camera system includes a camera body operated in accordance with programs stored in a program storage circuit and a peripheral for rewriting at least a part of the programs. The camera body comprises a data storage circuit which stores structure data of the camera. The peripheral comprises a communication circuit for receiving the structure data of the camera and a control circuit for determining whether the programs should be rewritten based on the structure data.

24 Claims, 5 Drawing Sheets

PERIPHERAL AND CAMERA SYSTEM USING THE SAME, FOR REWRITING PROGRAMS STORED IN A CAMERA

Matter enclosed in heavy brackets [ ] appears in the original patent but forms no part of this reissue specification; matter printed in italics indicates the additions made by reissue.

BACKGROUND OF THE INVENTION

The present invention relates to a peripheral and a camera system using the same, in which programs, stored in a memory element of the camera body and operable in accordance with the programs, can be externally rewritten.

Conventionally, various techniques have been disclosed, which relate to a camera incorporating a memory element for performing various operations based on programs prestored in the memory element, and a camera system including the camera and a peripheral.

For example, U.S. Pat. No. 4,853,733 discloses a technique by which all or part of the programs, i.e., the bases of various operations, stored in a memory element incorporated in the camera, can be rewritten by means of an external peripheral, so that a function desired by the user can be realized.

However, limited functions are realizable only by rewriting the programs as described above. In other words, to obtain a more sophisticated function, it is necessary that hardware (at least of the units constituting the camera) be exchanged by the user and the programs for this purpose be installed.

At this time, since both old and new hardware is on the market, if a program compatible with a new function is installed in a system including a camera of the old hardware structure, the camera will be inoperable, and if things come to the worst, components of the camera may be broken.

BRIEF SUMMARY OF THE INVENTION

The present invention has been made in consideration of the above problems. An object of the present invention is to provide a peripheral data and a camera system using the same, wherein, if software is rewritten in accordance with the change in hardware structure, compatibility between the hardware and the software is determined, thereby avoiding a problem, such as an inoperable condition or a breakdown of a component.

To achieve the above objects, according to a first aspect of the present invention, there is provided a camera system including a camera operated in accordance with predetermined programs and a peripheral for rewriting at least a part of the predetermined programs, the camera comprising: a plurality of camera operating means; program storage means contents of which are rewritable; control means for controlling the plurality of camera operating means in accordance with the contents of the program storage means; data transmitting means for transmitting camera structure data to the peripheral; and rewriting means for, upon receipt of a program to be installed from the peripheral, rewriting the contents of the program storage means, and the peripheral comprising: determining means for, upon receipt of the camera structure data, determining whether rewriting of the contents of the program storage means is permitted; program transmitting means for transmitting a rewriting program to the rewriting means, when the determining means determines that the rewriting is permitted; and notifying means for notifying that the rewriting is not permitted, when the determining means determines that the rewriting is not permitted.

According to a second aspect of the present invention, there is provided a camera system including a camera and a peripheral of the camera, the camera comprising: a program storage circuit storing camera operation control programs, contents of which are rewritable; a data storage circuit storing camera structure data; a camera-side communication circuit for conducting communications with the peripheral; and a camera-side control circuit, having a program rewriting mode, for transmitting in the program rewriting mode the camera structure data stored in the data storage circuit to the peripheral via the camera-side communication circuit and writing a rewriting program transmitted from the peripheral via the camera-side communication circuit into the program storage circuit, and the peripheral comprising: a peripheral-side communication circuit for performing communications with the camera; a storage medium for storing the rewriting program; and a peripheral-side control circuit for determining whether an operation of rewriting the program storage circuit is permitted, and if it is permitted, transmitting the rewriting program stored in the storage medium to the camera.

According to a third aspect of the present invention, there is provided a camera system including a camera operated in accordance with predetermined programs and a peripheral for controlling a rewriting operation of rewriting at least a part of the predetermined programs, the camera comprising: a camera body unit; an exchange unit detachably mounted on the camera body unit; and a camera-side communication circuit for transmitting identification data of the exchange unit to the peripheral; the peripheral comprising: a peripheral-side communication circuit for receiving the identification data; and a peripheral-side control circuit for controlling the rewriting operation in accordance with the identification data.

According to a fourth aspect of the present invention, there is provided a peripheral for performing a rewriting operation of rewriting a program stored in a storage circuit in a camera, the peripheral comprising; storage means storing a rewriting program; receiving means for receiving camera structure data from the camera; determining means for determining whether the rewriting operation is permitted in accordance with the camera structure data; and alarm means for displaying an alarm, when the determining means determines that the rewriting operation is not permitted.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described with reference to the accompanying drawings.

Figure 1:
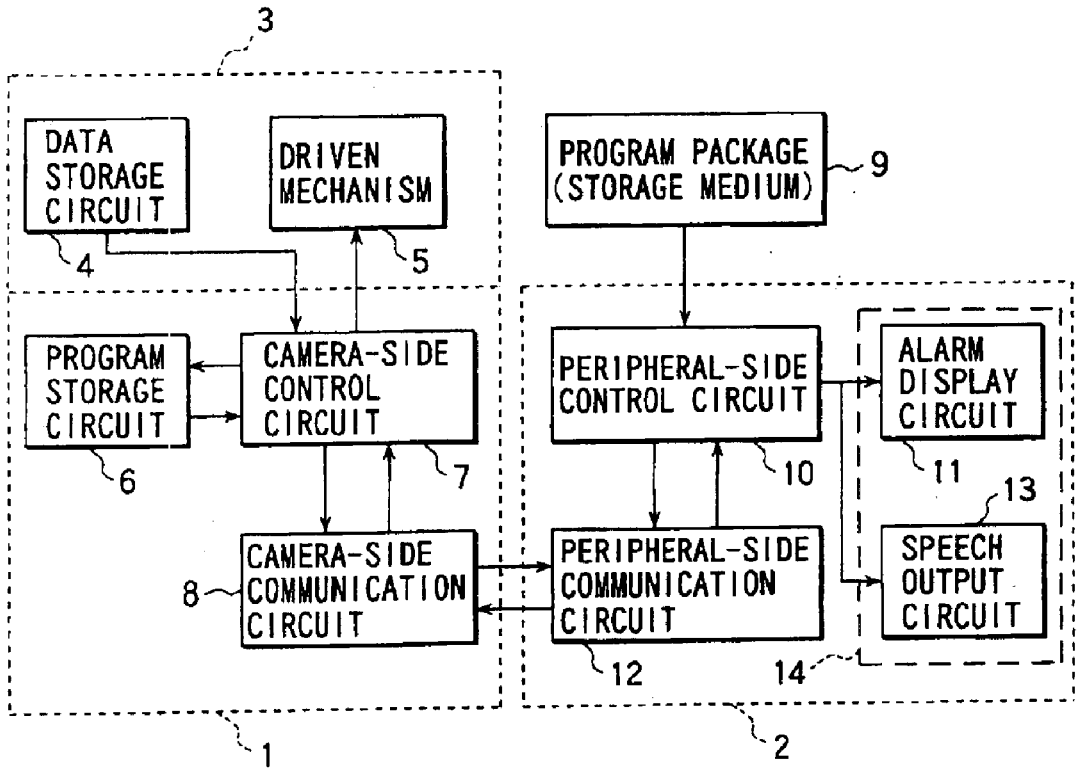
FIG. 1 is a block diagram showing the structure of a peripheral and a camera system using the same according to an embodiment of the present invention.

FIG. 1 is a block diagram showing the structure of a peripheral and a camera system using the same according to an embodiment of the present invention.

As shown in FIG. 1, a camera is formed of the combination of a main unit (camera body) 1 and an exchangeable unit (exchange unit) 3. In this camera, a camera-side control circuit 7 of the camera body 1 controls various operations in accordance with command codes, i.e., operation programs stored in a program storage circuit 6. The exchange unit 3 includes a driven mechanism 5 which is operated in accordance with a control signal supplied from the camera-side control circuit 7. The exchange unit 3 also includes a data storage circuit 4, storage means for storing identification data (hardware data) of the exchange unit itself.

If a new exchange unit 3, which is not compatible with the operation programs stored in the program storage circuit 6, is mounted on the camera body 1, a proper camera operation cannot be performed. In this case, it is necessary to externally rewrite the operation programs stored in the program storage circuit 6 through a camera-side communication circuit 8 in the camera body 1 (reinstall).

This operation is performed by a peripheral 2, which is connected to the camera body 1 via communication circuits 8 and 12. The peripheral is an apparatus for transmitting operation programs stored in a detachable program package 9 to the camera body 1. The peripheral 2 comprises a peripheral-side control circuit 10, i.e., control means for controlling operation sequences of the peripheral 2 itself, a peripheral-side communication circuit 12 including receiving means for achieving communication with the camera body 1, and an alarm circuit 14 including an alarm display circuit 11 and a speech output circuit 13. The peripheral-side control circuit 10 controls a series of operations, such as reading programs to be installed in the camera body 1 from a program package (memory medium) 9 connected thereto and transferring the read programs to the camera body 1 via the peripheral-side communication circuit 12.

In the camera body 1, the camera-side control circuit 7 sequentially stores (installs) the operation programs, received through the camera-side communication circuit 8, in the predetermined address regions of the program storage circuit 6. After the installation is completed, only when the peripheral 2 is removed and the camera alone is operated, a suitable operation corresponding to the exchange unit 3 can be performed.

When the aforementioned operation programs are installed, if operation programs which are compatible with the exchange unit presently mounted on the camera body are installed, the camera will be inoperable, and components of the camera may even be broken. In consideration of the problem, it is necessary, before installation of the operation programs, to confirm whether the exchange unit 3 mounted on the camera body is compatible with the operation programs.

According to this embodiment, when the peripheral 2 transmits a communication request, the camera-side control circuit 7 obtains hardware data from the data storage circuit 4 in the exchange unit 3 and transmits it to the peripheral 2. Based on the information, the peripheral 2 determines whether the operation programs are compatible with the exchange unit. If they are not compatible, the installation cannot be executed and the alarm display circuit 11 will display an alarm. With this method, the problem of the conventional device as described above, such as an inoperable condition or a breakdown of the camera, can be avoided.

The structure to which the embodiment is applied will be described with reference to FIG. 2.

Figure 2:
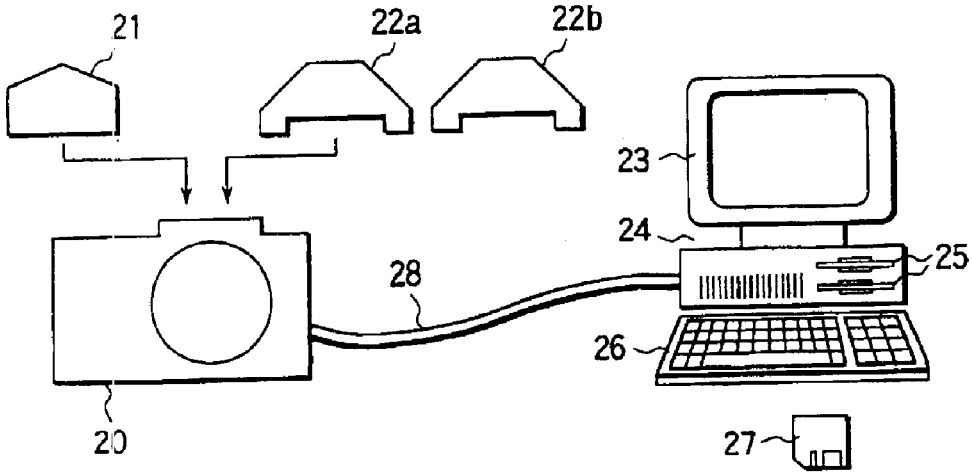
FIG. 2 is a diagram showing the structure to which the embodiment is applied.

In the system shown in FIG. 2, an optical finder 21 or an electronic finder 22a is detachably mounted on a camera body 20 as an exchange unit, when the camera is on the market.

The optical fiber 21 has a finder structure applied to the conventional single-lens reflex camera, comprising a pentagonal prism, a focusing screen, an eyepiece optical system, etc. The electronic finder 22a, for picking up an image of an object by an image pickup element, such as a CCD, and observing an electronic image of the object by a monitor device, for example, an electronic view finder. The electronic finder comprises an image pickup circuit including an image pickup element, an image processing circuit and a storage element. It also comprises a monitor circuit for displaying an electronic image.

If the optical finder 21 and the electronic finder 22a are used in exchange, the functions of these finders can be realized by the programs prestored in the camera. However, if a new finder, an electronic finder with a superimposing function, is mounted on the camera, the new function cannot be realized by the prestored programs.

To solve this problem, according to this embodiment, a peripheral, i.e., a personal computer 24 is connected to the camera body 20 through a communication cable 28, so that the programs compatible with the electronic finder 22b and stored in a floppy disk 27 can be installed in the camera body 20 via a floppy disk drive 25.

However, as described above, if the finder 22b is not mounted on the camera, installation of the programs compatible with the electronic finder 22b should be avoided. For this purpose, according to this embodiment, the personal computer 24 reads hardware data from the data storage circuit (not shown in FIG. 2) of the finder and determines whether the programs to be installed are proper. If the programs are determined to be improper, the display 23 displays an alarm to that effect and the operation of installing the programs is stopped. Thus, it is possible to prevent an inoperable condition or breakdown.

Figure 3:
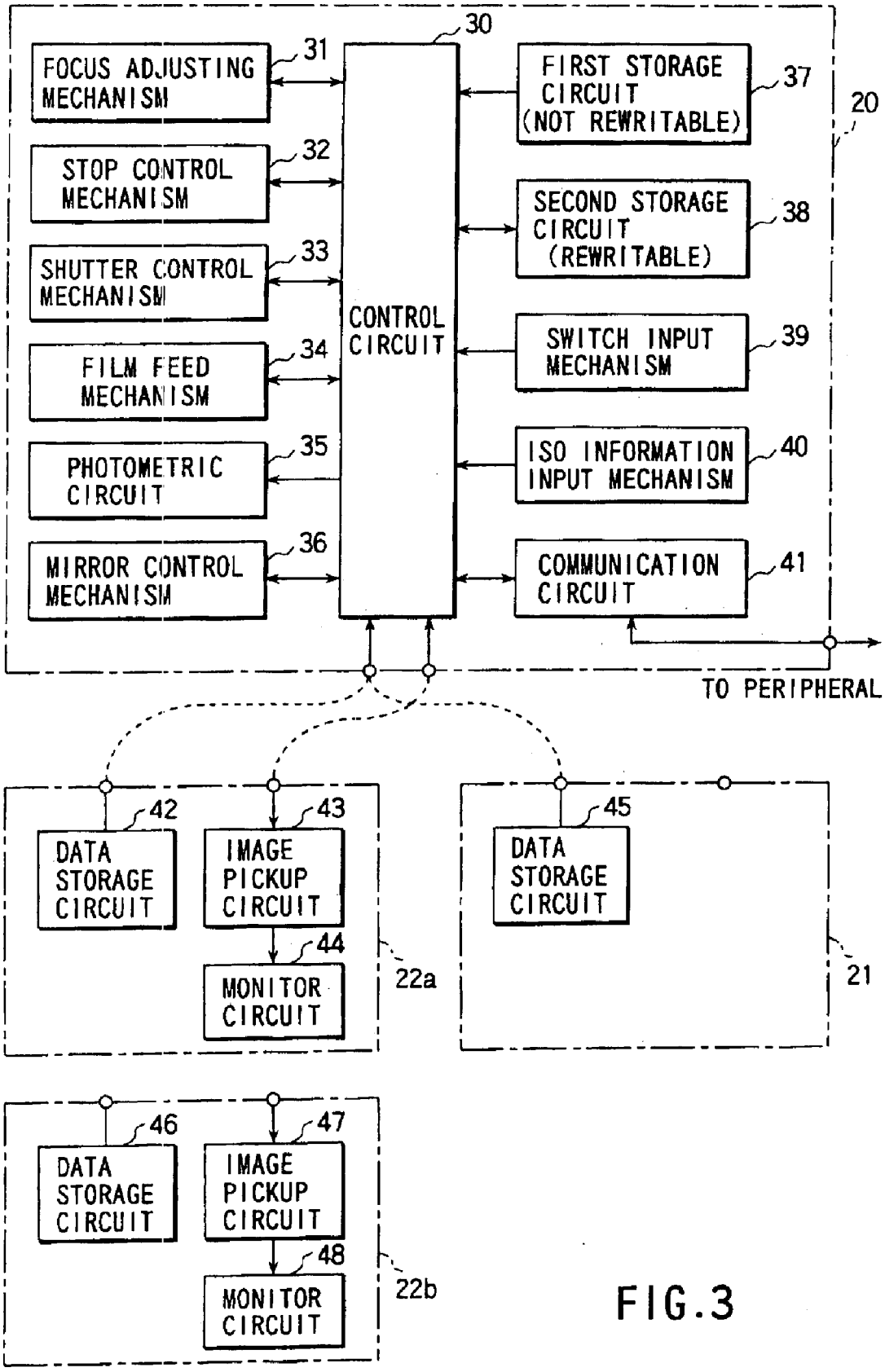
FIG. 3 is a diagram showing a more detailed structure of the camera system according to the embodiment.

A more detailed structure of the camera system of this embodiment will be described with reference to FIG. 3. As shown in FIG. 3, mechanisms and circuits as will be described below are connected to a camera-side control circuit 30. A focus adjusting mechanism 31 detects a distance to an object or an amount of deviation from the focal point with respect to the object, and moves an image pickup lens to an in-focus position. A stop control mechanism 32 drives a stop mechanism to a set stop value in an exposure operation. A shutter control mechanism 33 controls shutter opening and closing operations. A film feed mechanism 34 advances and rewinds a film. A photometric circuit 35 measures a luminance condition of the object. A mirror control mechanism 36 drives a movable mirror for guiding an image of the object to the fiber, when the object is observed. A first storage circuit 37, which is not rewritable, stores operation programs irrelevant to the mounted exchange unit. A second storage circuit 38, which is rewritable, stores operation programs compatible with the mounted exchange unit. A switch input mechanism 39 comprises a first release switch, a second release switch, a main switch, etc. An ISO information input mechanism 40 detects ISO sensitivity of the film. A communication circuit 41 performs communications with a peripheral not shown in FIG. 3.

The optical fiber 21 having only a data storage circuit 45 or the electronic finder 22a having a data storage circuit 42, an image pickup circuit 43 and a monitor circuit 44 is detachably mounted on the camera body 20. When the finder 21 or 22a is mounted on the camera body 20, each of the circuits of the finder is electrically connected to the camera-side control circuit 30 of the camera body 20.

The image pickup circuit 43 of the electronic finder 22a controls the operations of picking up an image of the object and displaying the image in the monitor circuit 44. It is operated in response to an image pickup command signal supplied from the camera body 20. The electronic finder 22b has the same circuit structure as that of the old electronic finder 22a, except that the image pickup circuit 43 is replaced by an image pickup circuit 47 having a superimposing function.

An operation of the camera body will be described with reference to the flowchart shown in FIG. 4.

In the following, descriptions of the general camera operations which do not involve the present invention, such as the film feeding operation, are omitted.

When the main switch (not shown) is operated, the main routine is started.

First, it is detected whether the electronic finder 22a or 22b is mounted (step S1). More specifically, hardware data is read from the data storage circuit 42, 45 or 46 to determine that. For example, the optical finder 21 sores the data "01" as hardware data in the data storage circuit 45, while the electronic finder 22a or 22b stores the data "10", so that it is determined which finder is mounted depending on the read hardware data "01" or "10".

If the electronic finder 22a or 22b is mounted, the subroutine "monitor display" corresponding to the electronic finder is executed (step S2), and the flow advances to a step S3 (to be described in detail later). On the other hand, if the optical finder 21 is mounted, the flow advances to the step S3, skipping over the step S2.

In the step S3, it is checked whether a communication request is transmitted from the peripheral. More specifically, it is checked whether the status of an I/O port to which the peripheral is connected is "L" or "H". If the status is "H", it is determined that a communication request is received. In this case, the subroutine "communications" is executed (step S11) (to be described in detail later).

In the step S3, the status of the I/O port is not "H", the status of the first release switch operated in accordance with a release button (not shown) is checked. If the status of the first release switch is not "ON", the flow returns to the step S1. If it is "ON", the flow advances to a step S5 (step S4).

The control circuit receives object luminance data from the photometric circuit 35 (step S5), and adjusts the focus by operating the focus adjusting mechanism (step S6). Thereafter, it is checked whether the second release switch is "ON" (step S7). If the second release switch is not "ON", the first release switch is checked again. If the first release switch is still "ON", the flow returns to step S7; however, if it is not "ON", the flow returns to the step S1, since it is considered that the operator releases the release button (step S12).

On the other hand, if it is determined that the second release switch is "ON" in the step S7, an exposure operation is executed (step S8). In this operation, the stop control mechanism 32, the mirror control mechanism 36 and the shutter control mechanism 33 are operated to record an image of the object on the film surface. Then, the film feed mechanism 34 is operated to advance the film a frame (step S9). When a series of image pickup operations are thus completed, the status of the main switch is checked. If the main switch is not turned off, the flow returns to the step S1 (step S10).

The aforementioned subroutine "monitor display" will be described with reference to the flowcharts shown in FIGS. 5 and 6.

The subroutine "monitor display" is executed when the electronic finder 22a or 22b is mounted. The subroutine "monitor display" must be varied according to the kind of electronic finder 22a or 22b. More specifically, since the new electronic finder 22b is different from the old electronic finder 22a in that the superimposing function is added, a control for superimposition display must be performed, when the electronic finder 22b is mounted. In consideration of this point, the program for the subroutine "monitor display" is stored in the rewritable second storage circuit 38 in the camera body 20.

Figure 5:
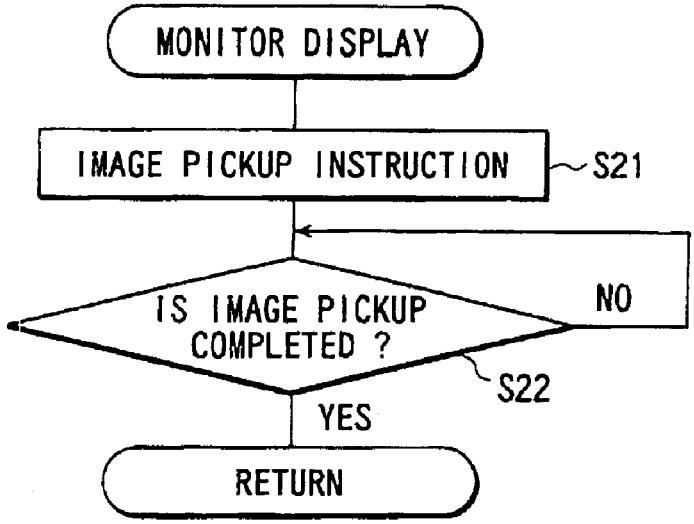
FIG. 5 is a flowchart for explaining a subroutine "monitor display"

In the subroutine "monitor display" for the old electronic finder 22a shown in FIG. 5, an image pickup operation is first instructed (step S21), and if an image pickup completion signal is received, the flow returns to the main routine (step S22).

Figure 6:
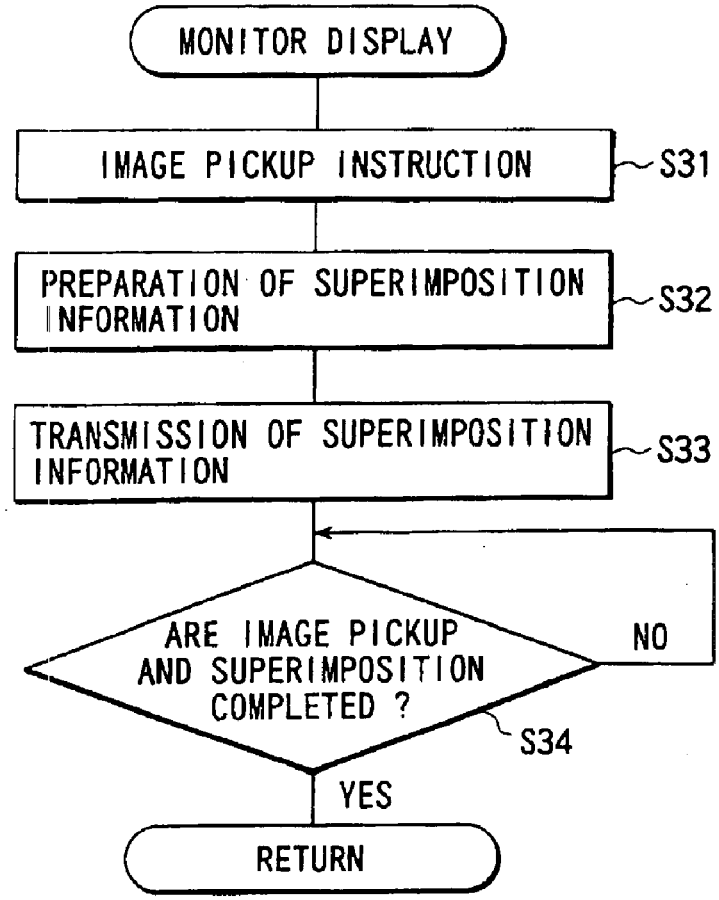
FIG. 6 is a flowchart for explaining a subroutine "monitor display"

In the subroutine "monitor display" for the new electronic finder 22b shown in FIG. 6, superimposition information, for example, information on an image pickup mode and the mounted unit, are prepared (steps S31 and S32), and the information are transmitted to the image pickup circuit 47 of the electronic finder 22b (step S33). Then, if an image pickup completion signal and a superimposition completion signal are received from the image pickup circuit 47, the flow returns to the main routine (step S34).

Figure 7:
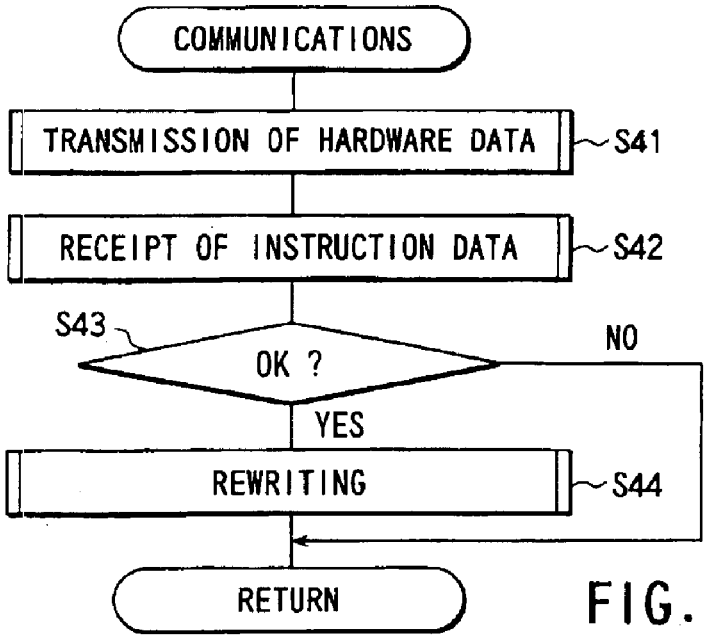
FIG. 7 is a flowchart showing a communicating operation of the camera body 20 performed when operation programs are installed in a second storage circuit 38.
Figure 8:
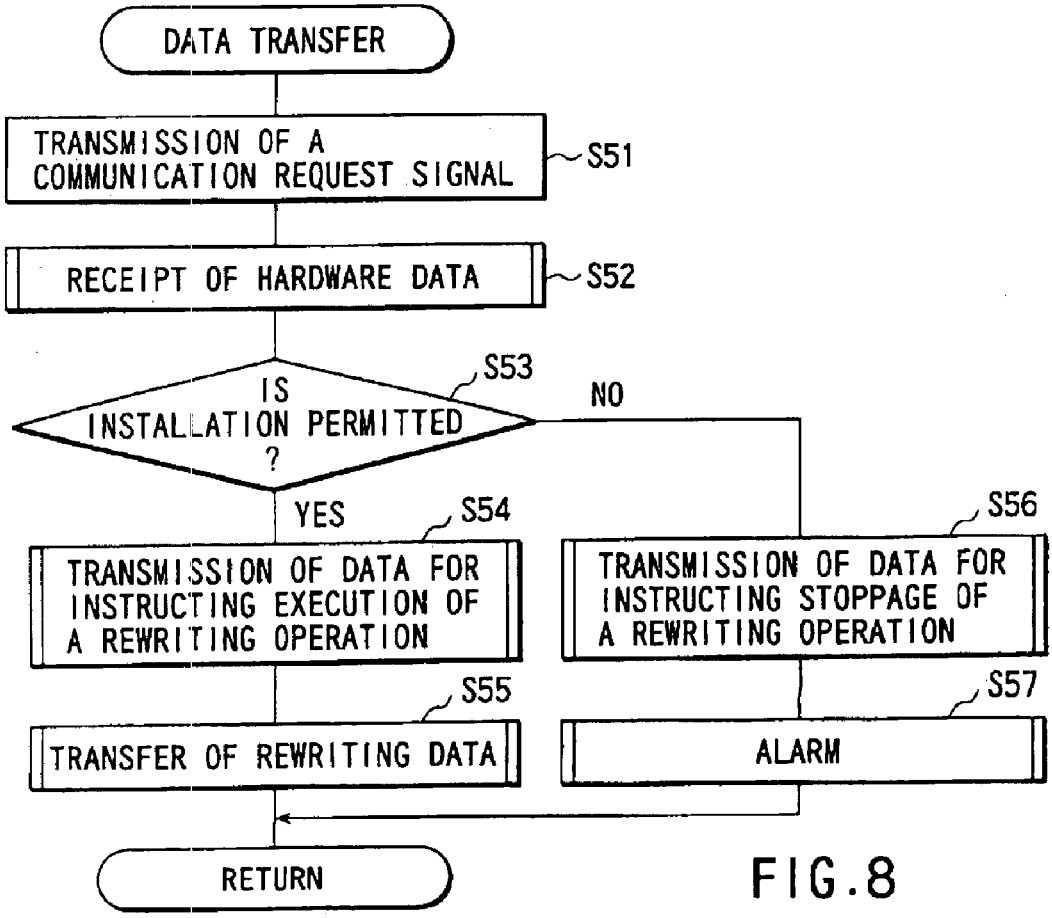
FIG. 8 is a flowchart showing a communicating operation of a peripheral, the personal computer 24, performed when the operation programs are installed in the second storage circuit 38.

FIGS. 7 and 8 are flowcharts showing communicating operations of the camera body 20 and the peripheral, i.e., the personal computer 24, which are performed when operation programs are installed in the second storage circuit 38. Since the two operations are performed in parallel, they will be described with reference to both FIGS. 7 and 8.

In the state where the camera body 20 is connected to the peripheral, the personal computer 24, via the communication cable 28 (see FIG. 2), when the operator instructs an install operation by operating the keyboard 26 of the personal computer 24, a data transfer subroutine on the peripheral side as shown in FIG. 8 is executed. In this subroutine, first, a communication request signal is transmitted from the personal computer 24 to the camera body 20 (step S51).

Figure 4:
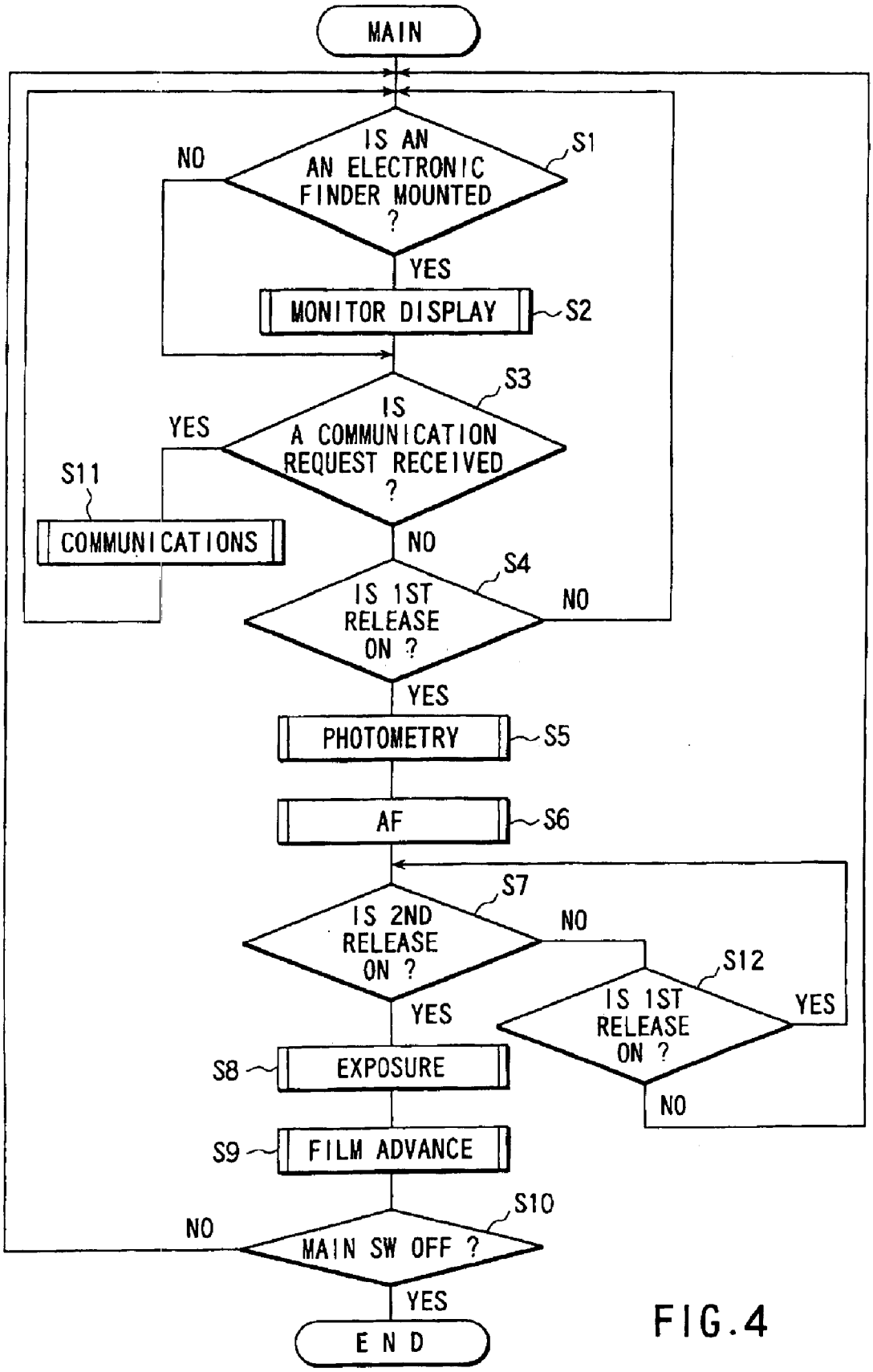
FIG. 4 is a flowchart showing details of an operation of the camera body according to the embodiment.

Upon receipt of this signal, the camera-side control circuit 30 enters the sequence shown in FIG. 7 as the subroutine "communications" of the step S11 shown in FIG. 4. First, the control circuit 30 reads hardware data from the data storage circuit 42, 45 or 46 of the exchange unit and transmits it to the personal computer 24 (step S41).

In a step S52 shown in FIG. 8, the personal computer 24 receives the hardware data. It determines whether the operation programs to be installed are compatible with the exchange unit mounted on the camera body 20. This determination is executed by checking whether the identification code contained in the hardware data coincides with the identification code contained in the operation programs.

If the codes coincide, installation is permitted. Therefore, the flow advances to a step S54, in which data for instructing execution of a rewriting operation is transmitted to the camera. Thereafter, rewriting data is transferred to the camera in a step S55. On the other hand, if the codes do not coincide, data for instructing stoppage of a rewriting operation is transmitted to the camera in a step S56. Thereafter, an alarm is displayed on the display screen to notify the operator that the installation is improper (impossible) (step S57). Then, the flow returns to the main routine.

In a step S42 shown in FIG. 7, the camera-side control circuit 30 receives the data for instructing execution of the rewriting operation. It determines whether installation should be executed on the basis of the received data. If it determines that the installation should be executed, the flow advances to a step S44. In this step, the operation programs transmitted from the peripheral, the personal computer 24, are successively written in predetermined addresses of the second storage circuit 38, i.e., the addresses allotted to the subroutine "monitor display".

The present invention is not limited to the embodiment described above, but can be improved and modified within the scope of the gist of the invention.

For example, the finders are described as exchange units in the above embodiment. However, the exchange units are not limited to the finders, but may be any units exchangeable by the user, such as image recording medium units of different formats and recording systems, an interchangeable lens unit having a new function, and a multifunction data pack unit.

According to the embodiment of the modification of the present invention, when a new exchange unit is mounted on the camera and the control programs must be reinstalled, the compatibility between the exchange unit and the control programs is first recognized. Then, it is determined whether the reinstallation of the programs is permitted. Therefore, errors, which may occur due to incompatibility therebetween, are prevented.

As has been described above, according to the present invention, it is possible to provide a peripheral and a camera system using the same, wherein, if software is rewritten in accordance with the change in hardware structure, compatibility between the hardware and the software is determined, thereby avoiding a problem, such as an inoperable condition or a breakdown of a component.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

[1. A camera system including a camera operated in accordance with predetermined programs and a peripheral for rewriting at least a part of the predetermined programs, said camera comprising:

a plurality of camera operating means;

program storage means, contents of which are rewritable, for storing at least one program;

control means for controlling said plurality of camera operating means in accordance with the contents of the program storage means;

data transmitting means for transmitting camera structure data to the peripheral; and rewriting means for, upon receipt of a program to be installed from the peripheral, rewriting the contents of the program storage means, and said peripheral comprising:

determining means for, upon receipt of the camera structure data, determining whether rewriting of the contents of the program storage means is permitted;

program transmitting means for transmitting a rewriting program to the rewriting means, when the determining means determines that the rewriting is permitted; and notifying means for notifying that the rewriting is not permitted, when the determining means determines that the rewriting is not permitted.]

[2. A camera system according to claim 1, wherein the program storage means includes a first storage means which is not rewritable and a second storage means which is rewritable.]

[3. A camera system according to claim 1, wherein a plurality of exchange units can be selectively mounted on the camera.]

[4. A camera system according to claim 1, wherein the camera structure data concerns a unit mounted on the camera.]

[5. A camera system including a camera and a peripheral of the camera, said camera comprising:

a program storage circuit storing camera operation control programs, contents of which are rewritable;

a data storage circuit storing camera structure data;

a camera-side communication circuit for conducting communications with the peripheral; and a camera-side control circuit, having a program rewriting mode, for transmitting in the program rewriting mode the camera structure data stored in the data storage circuit to the peripheral via the camera-side communication circuit and writing a rewriting program transmitted from the peripheral via the camera-side communication circuit into the program storage circuit, and said peripheral comprising:

a peripheral-side communication circuit for performing communications with the camera;

a storage medium for storing the rewriting program; and a peripheral-side control circuit for determining whether an operation of rewriting the program storage circuit is permitted, and if it is permitted, transmitting the rewriting program stored in the storage medium to the camera.]

[6. A camera system according to claim 5, wherein the camera further comprises a camera body unit and an exchange unit mounted on the camera body unit, and the camera structure data concerns the exchange unit.]

[7. A camera system according to claim 5, wherein the camera further comprises a camera body unit and an exchange unit mounted on the camera body unit, and the data storage circuit is placed in the exchange unit.]

[8. A camera system according to claim 5, wherein the peripheral further comprises a notifying circuit for notifying that the operation of rewriting is not permitted, when it is determined that the operation of rewriting is not permitted.]

[9. A camera system according to claim 5, wherein the camera-side control circuit executes the program rewriting mode in accordance with a request signal from the peripheral.]

10. A camera system including a camera operated in accordance with predetermined programs and a peripheral for controlling a rewriting operation of rewriting at least a part of the predetermined programs, said camera comprising:

a camera body;

an exchange unit detachably mounted on the camera body unit; and a camera-side communication circuit for transmitting identification data of the exchange unit to the peripheral;

said peripheral comprising:

a peripheral-side communication circuit for receiving the identification data; and a peripheral-side control circuit for controlling the rewriting operation in accordance with the identification data.

11. A camera system according to claim 10, wherein the camera includes a data storage circuit for storing the identification data of the exchange unit.

12. A camera system according to claim 11, wherein the data storage circuit is placed in the exchange unit.

13. A camera system according to claim 10, wherein the peripheral-side control circuit determines whether the rewriting operation is permitted in accordance with the identification data.

14. A camera system according to claim 10, wherein the peripheral-side control circuit determines whether the rewriting operation is permitted in accordance with the identification data, and displays an alarm if it is not permitted.

15. A camera system according to claim 10, wherein the exchange unit comprises a finder.

16. A camera system according to claim 10, wherein the peripheral comprises a personal computer.

[17. A peripheral for performing a rewriting operation of rewriting a program stored in a storage circuit in a camera, said peripheral comprising:

storage means storing a rewriting program;

receiving means for receiving camera structure data from the camera;

determining means for determining whether the rewriting operation is permitted in accordance with the camera structure data; and alarm means for displaying an alarm, when the determining means determines that the rewriting operation is not permitted.]

[18. A camera system according to claim 17, wherein the storage means comprises a magnetic recording medium.]

[19. A camera system according to claim 17, wherein the storage means comprises a magnetic recording medium detachably attached to the peripheral.]

*20. A camera system comprising:*

*a camera including a main body unit and an exchange unit detachably mounted on the main body unit;*

*a peripheral connectable to the camera;*

*a first storage element, which is rewritable, disposed in the camera and storing a first operation program;*

*a second storage element disposed in the peripheral and storing a second operation program different from the first operation program;*

*a control circuit disposed in the camera and configured to carry out an operation of rewriting contents of the first storage element to the second operation program, wherein the control circuit carries out the operation of rewriting only when the second operation program is adapted for configuration of the camera including the exchange unit; and*

*an alarm circuit configured to provide an alarm when the second operation program is not adapted for the configuration of the camera including the exchange unit.*

*21. A camera system according to claim 20, wherein the peripheral comprises a personal computer.*

*22. A camera system according to claim 20, wherein the alarm circuit is disposed in the peripheral.*

*23. A camera system according to claim 20, wherein when the control circuit receives a command signal for executing the operation of rewriting from the peripheral in the operation of rewriting, the control circuit thereafter receives a program for the operation of rewriting.*

*24. A camera system according to claim 20, wherein when the control circuit receives a command signal for stopping the operation of rewriting from the peripheral in the operation of rewriting, the control circuit stops the operation of rewriting.*

*25. A camera comprising:*

*a camera main body;*

*an exchange unit detachably mounted on the camera main body and including a data storage circuit storing identification data specific to the exchange unit;*

*a program storage circuit storing a program to control operations of the camera; and*

*a control circuit configured to control a camera operation mechanism including the exchange unit in accordance with the program stored in the program storage circuit;*

*wherein contents of the program storage circuit are rewritable and the control circuit is capable of carrying out an operation of rewriting at least a pair of the contents of the program storage circuit in cooperation with a peripheral; and*

*wherein the operation of rewriting comprises reading the identification data stored in the data storage circuit of the exchange unit, receiving from the peripheral a program for rewriting adapted for the exchange unit based on the read identification data, and storing the program for rewriting in a predetermined region of the program storage circuit.*

*26. A camera according to claim 25, wherein when the control circuit receives a command signal for executing the operation of rewriting from the peripheral in the operation of rewriting, the control circuit thereafter receives a program for the operation of rewriting.*

*27. A camera according to claim 25, wherein when the control circuit receives a command signal for stopping the operation of rewriting from the peripheral in the operation of rewriting, the control circuit stops the operation of rewriting.*

*28. A camera comprising:*

*a camera main body;*

*an exchange unit detachably mounted on the camera body and including data output means for outputting an identification signal specific to the exchange unit;*

*program storage means for storing a program to control operations of the camera, wherein contents of the program storage means are rewritable;*

*control means for controlling a camera operation mechanism including the exchange unit in accordance with the program stored in the program storage means; and*

*rewriting means for rewriting at least a part of the contents of the program storage means in cooperation with a peripheral, said rewriting means including:*

*transmitting means for transmitting information based on the identification signal to the peripheral;*

*receiving means for receiving an operation program adapted for the exchange unit and an execution permission signal to permit an operation of rewriting from the peripheral; and*

*storage control means for causing the program storage means to store the received operation program, when the execution permission signal is received.*

*29. A camera system comprising a camera operated in accordance with predetermined programs and a peripheral for controlling a rewriting operation of rewriting at least a part of the predetermined programs, wherein*

(*i*) *the camera comprising:*

*a camera body unit;*

*an exchange unit detachably mounted on the camera body unit; and*

*a camera-side communication circuit configured to transmit identification data of the exchange unit to the peripheral; and*

(*ii*) *the peripheral comprises:*

*a peripheral-side communication circuit configured to receive the identification data of the exchange unit; and*

*a peripheral side control circuit configured to transmit a rewriting program to said camera in accordance with the identification data of the exchange unit.*

*30. A camera system according to claim 29, wherein the camera includes a data storage circuit configured to store the identification data of the exchange unit.*

*31. A camera system according to claim 30, wherein the data storage circuit is provided in the exhaust unit.*

*32. A camera system according to claim 29, wherein the peripheral-side control circuit determines whether the rewriting operation is permitted in accordance with the identification data of the exchange unit.*

*33. A camera system according to claim 29, wherein the peripheral-side control circuit determines whether the rewriting operation is permitted in accordance with the identification data of the exchange unit, and provides an alarm if the rewriting operation is not permitted.*

*34. A camera system according to claim 29, wherein the exchange unit comprises a finder.*

*35. A camera system according to claim 29, wherein the peripheral comprises a personal computer.*

*36. A program rewriting method in a camera to which an exchange unit is detachably mounted, the method comprising:*

*reading identification information specific to the exchange unit stored in the exchange unit;*

*transmitting data based on the identification information to a peripheral;*

*receiving, from the peripheral, a rewriting process adapted for the exchange unit selected in accordance with the data; and*

*executing a program rewriting operation in accordance with the received rewriting program.*

* * * * *